United States Patent
Prakash et al.

(10) Patent No.: US 9,143,977 B2
(45) Date of Patent: Sep. 22, 2015

(54) BACKGROUND TRAFFIC HANDLING IN LTE

(71) Applicant: QUALCOMM Incorporated, San Diego, CA (US)

(72) Inventors: Rajat Prakash, La Jolla, CA (US); Hao Xu, San Diego, CA (US); Osok Song, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 279 days.

(21) Appl. No.: 13/835,579

(22) Filed: Mar. 15, 2013

(65) Prior Publication Data

US 2013/0272129 A1  Oct. 17, 2013

Related U.S. Application Data

(60) Provisional application No. 61/624,168, filed on Apr. 13, 2012.

(51) Int. Cl.
*H04W 28/02* (2009.01)
*H04W 76/04* (2009.01)
(Continued)

(52) U.S. Cl.
CPC ...... *H04W 28/0221* (2013.01); *H04W 28/0268* (2013.01); *H04W 52/0216* (2013.01); *H04W 76/02* (2013.01); *H04W 76/048* (2013.01); *H04W 72/10* (2013.01); *H04W 76/068* (2013.01)

(58) Field of Classification Search
CPC ....................... H04W 28/0221; H04W 28/0268
USPC .................................. 370/235, 230, 252, 311
See application file for complete search history.

(56) References Cited

U.S. PATENT DOCUMENTS 6,999,759 B2 * 2/2006 Harris et al. .................. 455/418
7,903,550 B2 * 3/2011 Schmidt et al. ............... 370/230
(Continued)

FOREIGN PATENT DOCUMENTS

WO 2008133564 A1 11/2008

OTHER PUBLICATIONS

China Unicom: "Considerations on DL control signaling enhancement", 3GPP Draft; R2-115316, 3rd Generation Partnership Project (3GPP), Mobile Competence Centre; 650, Route des Lucioles; F-06921 Sophia-Antipolis Cedex; France, vol. RAN WG2, No. Zhuhai; Oct. 10, 2011, Oct. 3, 2011, XP050540849, [retrieved on Oct. 3, 2011] the whole document.

(Continued)

*Primary Examiner* — Rasheed Gidado
(74) *Attorney, Agent, or Firm* — Arent Fox LLP

(57) ABSTRACT

A method, an apparatus, and a computer program product for wireless communication are provided. The apparatus may be an eNB. In one configuration the eNB may establish a connection to a remote apparatus, receive a message from the remote apparatus indicating that the connection is supporting one of background traffic or active traffic, determine whether the connection is supporting the background traffic or the active traffic using the message, and set a time value for a state timer related to an operating state of the remote apparatus based on whether the connection is supporting the background traffic or the active traffic. In another configuration the eNB may establish a connection to a remote apparatus and disable one or more modes of communication based on whether the connection is supporting the background traffic or the active traffic.

62 Claims, 14 Drawing Sheets

(51) Int. Cl.
*H04W 76/02* (2009.01)
*H04W 52/02* (2009.01)
*H04W 76/06* (2009.01)
*H04W 72/10* (2009.01)

(56) References Cited

U.S. PATENT DOCUMENTS

| | | | |
|---|---|---|---|
| 8,023,522 B2* | 9/2011 | Gobriel et al. | 370/412 |
| 8,169,943 B2* | 5/2012 | Pelletier et al. | 370/311 |
| 2005/0287949 A1 | 12/2005 | Harris et al. | |
| 2010/0144363 A1 | 6/2010 | De Rosa et al. | |
| 2011/0319064 A1 | 12/2011 | Lenart et al. | |
| 2012/0120828 A1 | 5/2012 | Anderson et al. | |
| 2012/0129509 A1 | 5/2012 | Chan et al. | |
| 2013/0044664 A1* | 2/2013 | Nory et al. | 370/311 |
| 2013/0084869 A1* | 4/2013 | Johansson et al. | 455/436 |

OTHER PUBLICATIONS

International Search Report and Written Opinion—PCT/US2013/032844—ISA/EPO—Oct. 24, 2013.

3GPP: "3rd Generation Partnership Project; Technical Specification Group Radio Access Network; LTE RAN Enhancements for Diverse Data Applications (Release 11)", 3GPP Draft; TR 36.822-040, 3rd Generation Partnership Project (3GPP), Mobile Competence Centre; 650, Route des Lucioles; F-06921 Sophia-Antipolis Cedex; France, Mar. 30, 2012, XP050606587, [retrieved on Mar. 30, 2012], p. 6-p. 44.

Catt: "Evaluation on DRX and Dormancy Timer for Background Traffic and IM Traffic", 3GPP Draft; R2-121136, Evaluation on DRX and Dormancy Timer for Background Traffic and IM Traffic, 3rd Generation Partnership Project (3GPP), Mobile Competence Centre; 650, Route des Luciole; F-06921 Sophia-Antipolis Cedex; France, vol. RAN WG2, No. Jeju, Korea; Mar. 26, 2012-Mar. 30, 2012, Mar. 20, 2012, XP050606156, [retrieved on Mar. 20, 2012] the whole document.

Intel Corporation: "Evaluation of UE Power Consumption and Latency using DRX Parameters Switching", 3GPP Draft; R2-121747, 3rd Generation Partnership Project (3GPP), Mobile Competence Centre; 650, Route des Lucioles; F-06921 Sophia-Antipolis Cedex; France, vol. RAN WG2, No. Jeju, Korea; Mar. 26, 2012-Mar. 30, 2012, Mar. 20, 2012, XP050606441, [retrieved on Mar. 20, 2012] p. 1-p. 3; figures 1,2; table 1.

Nokia Corporation et al: "DRX for background traffic", 3GPP Draft; R2-120500, DRX for Backgroud Traffic, 3rd Generation Partnership Project (3GPP), Mobile Competence Centre; 650, Route des Lucioles ; F-06921 Sophia-Antipolis Cedex ; France, vol. RAN WG2, No. Dresden, Germany; Feb. 6, 2012-Feb. 10, 2012, Jan. 31, 2012, XP050565417, [retrieved on Jan. 31, 2012] A the whole document.

NTT DoCoMo, Inc.: "Views on DRX/DTX Control in LTE" 3GPP TSG-RAN WG2 #56, R2-063397, Nov. 6-10, 2006, Riga, Latvia, pp. 1-3.

Partial International Search Report—PCT/US2013/032844—ISA/EPO—Aug. 16, 2013.

* cited by examiner

BACKGROUND TRAFFIC HANDLING IN LTE

CROSS-REFERENCE TO RELATED APPLICATION(S)

This application claims the benefit of U.S. Provisional Application Ser. No. 61/624,168, entitled "Background Traffic Handling in LTE" and filed on Apr. 13, 2012, which is expressly incorporated by reference herein in its entirety.

BACKGROUND

1. Field

The present disclosure relates generally to communication systems, and more particularly, to background traffic handling in LTE.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus establishes a connection to a remote apparatus, the connection configured to support at least one of background traffic and active traffic, receives a message from the remote apparatus indicating that the connection is supporting one of the background traffic or the active traffic, determines whether the connection is supporting the background traffic or the active traffic using the message, and sets a time value for a state timer related to an operating state of the remote apparatus based on whether the connection is supporting the background traffic or the active traffic.

In an aspect of the disclosure, a method, a computer program product, and an apparatus are provided. The apparatus establishes a connection to a remote apparatus, the connection configured to support at least one of background traffic and active traffic, and disables one or more modes of communication based on whether the connection is supporting the background traffic or the active traffic.

In an aspect of the disclosure, a method, a computer program product, and a remote apparatus are provided. The remote apparatus establishes a connection to an apparatus, the connection configured to support at least one of background traffic and active traffic. The remote apparatus determines whether the connection is supporting the background traffic or the active traffic, and sends a message to the apparatus indicating that the connection is supporting one of the background traffic or the active traffic.

DETAILED DESCRIPTION

Figure 1:
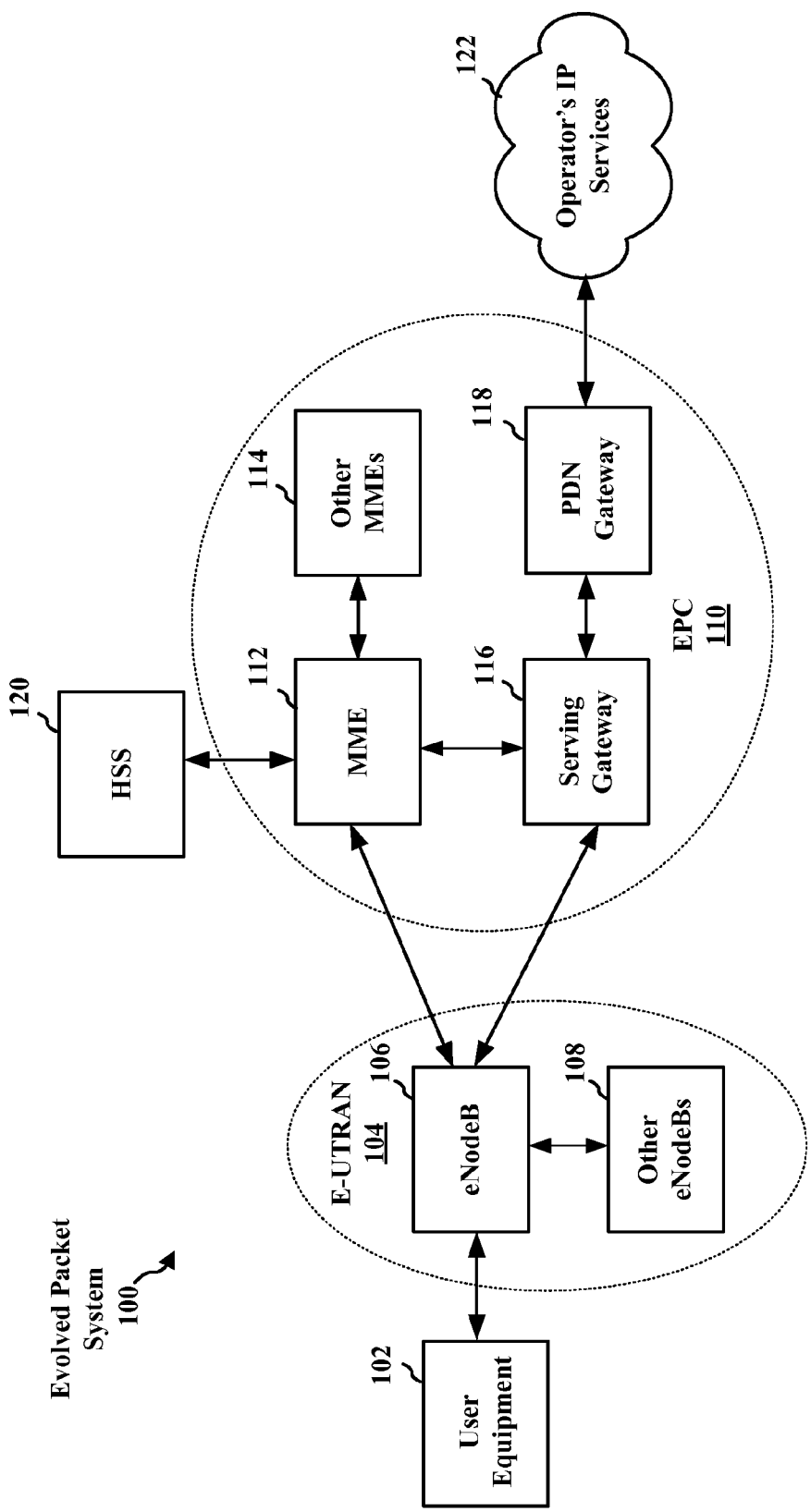
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods.

These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
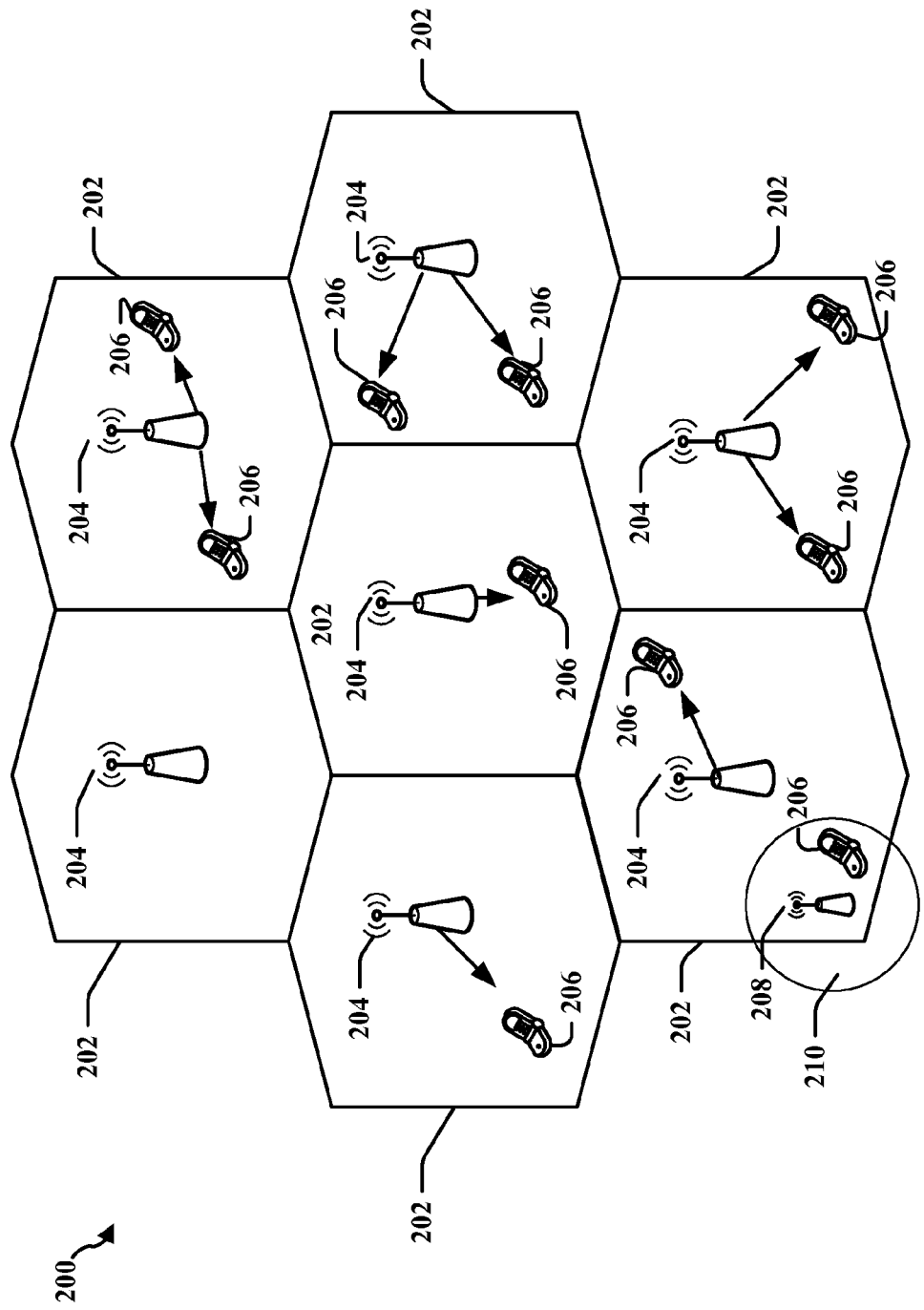
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
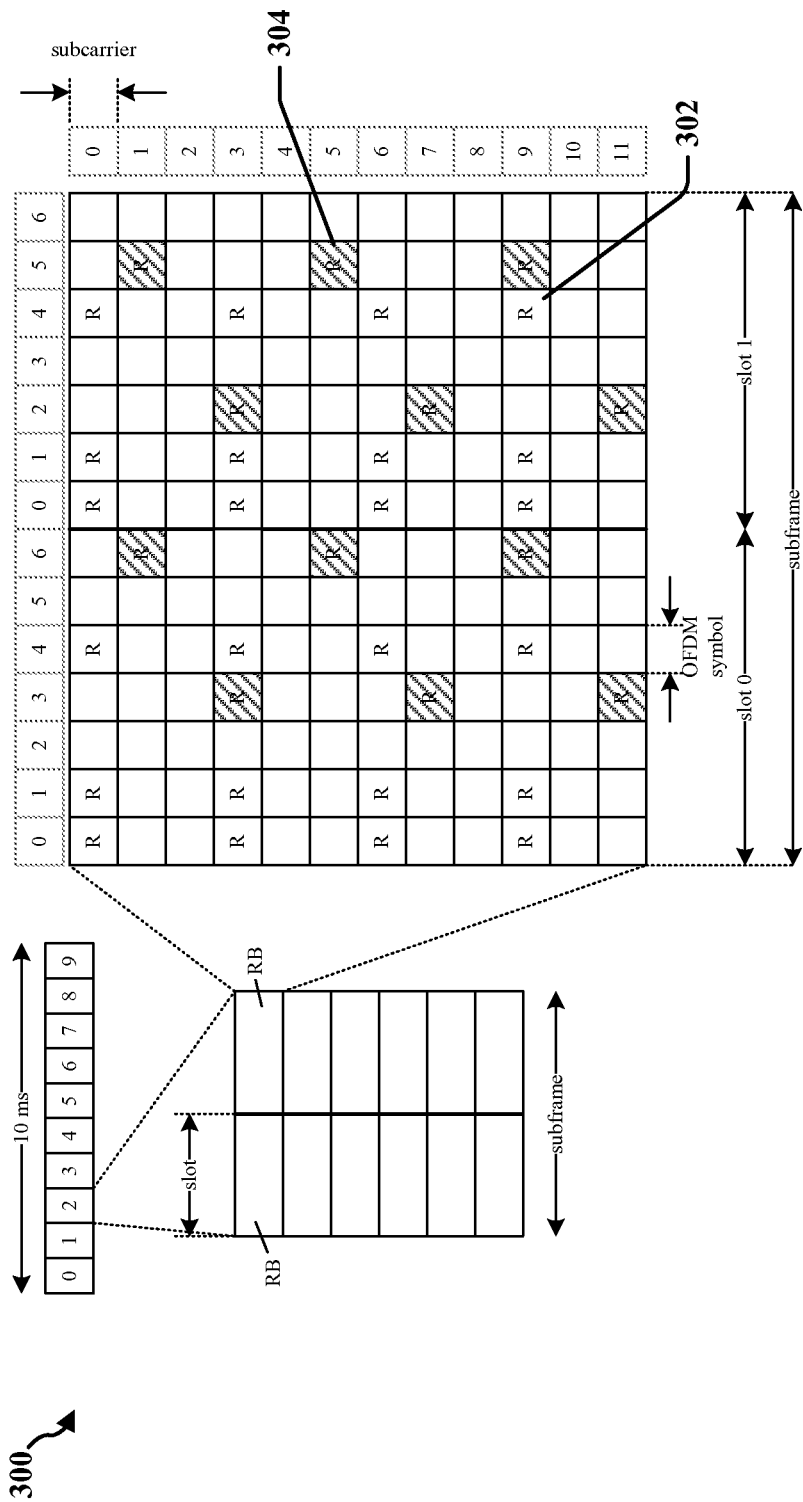
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
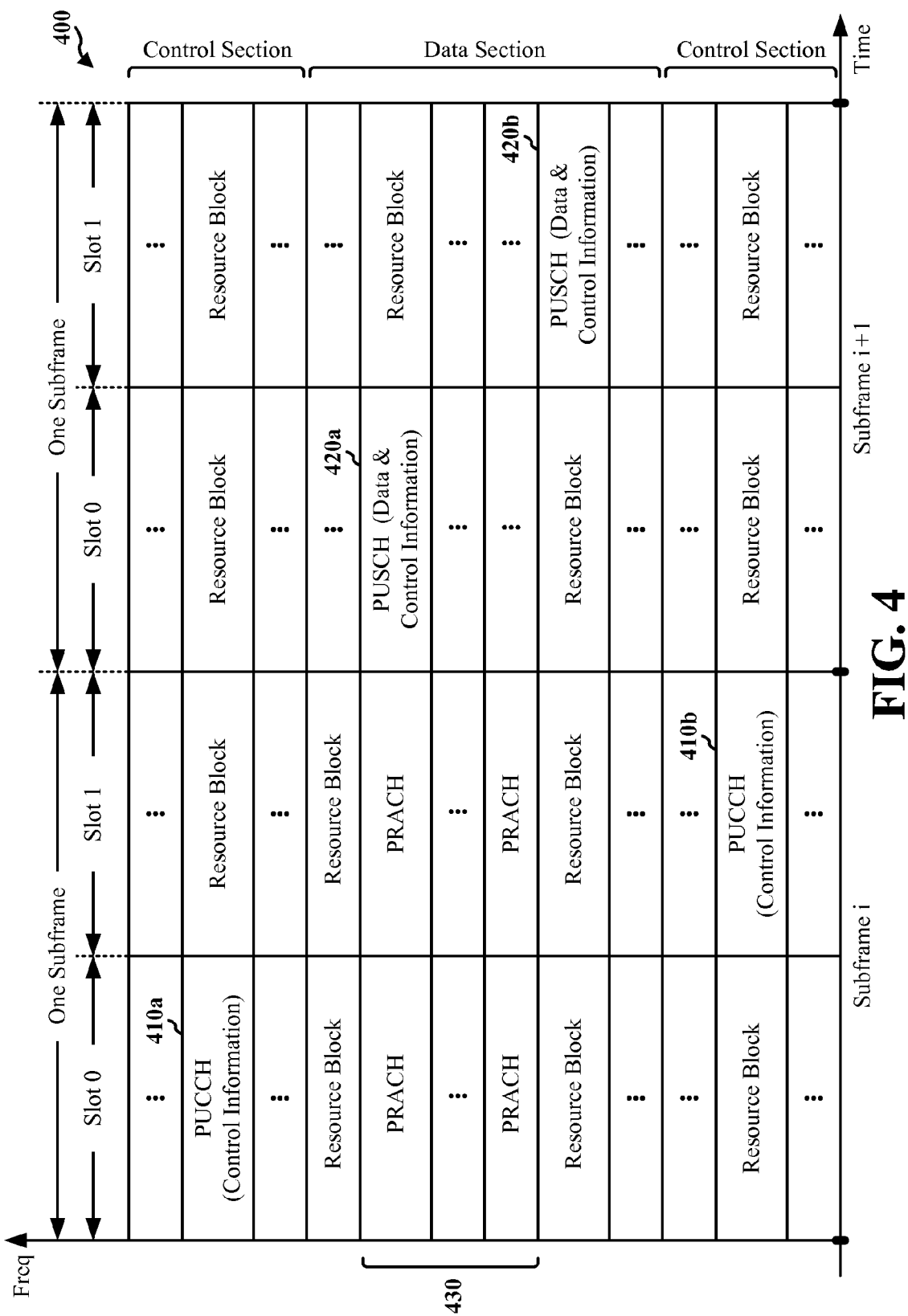
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410*a*, 410*b* in the control section to transmit control information to an eNB. The UE may also be assigned resource blocks 420*a*, 420*b* in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
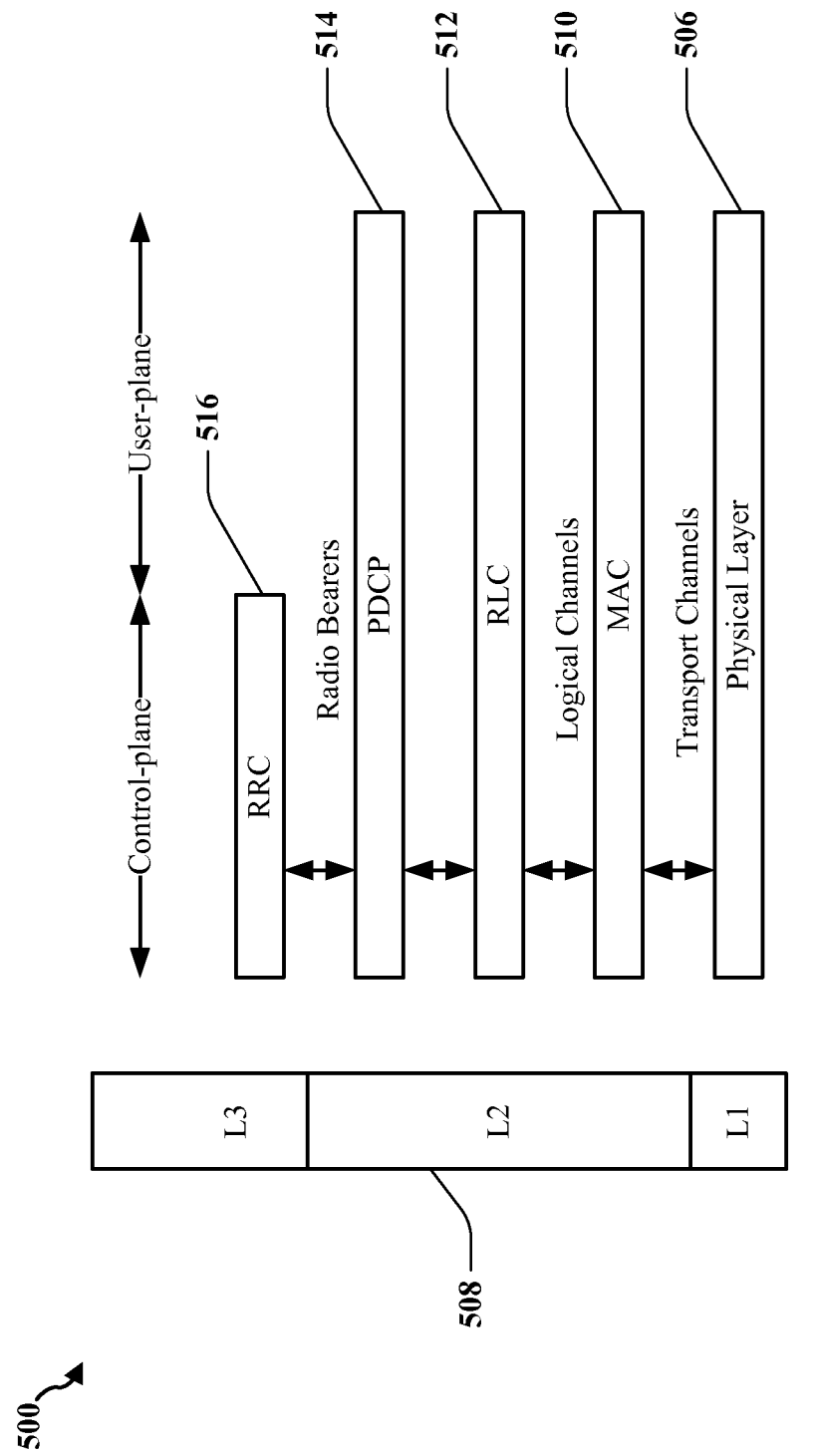
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
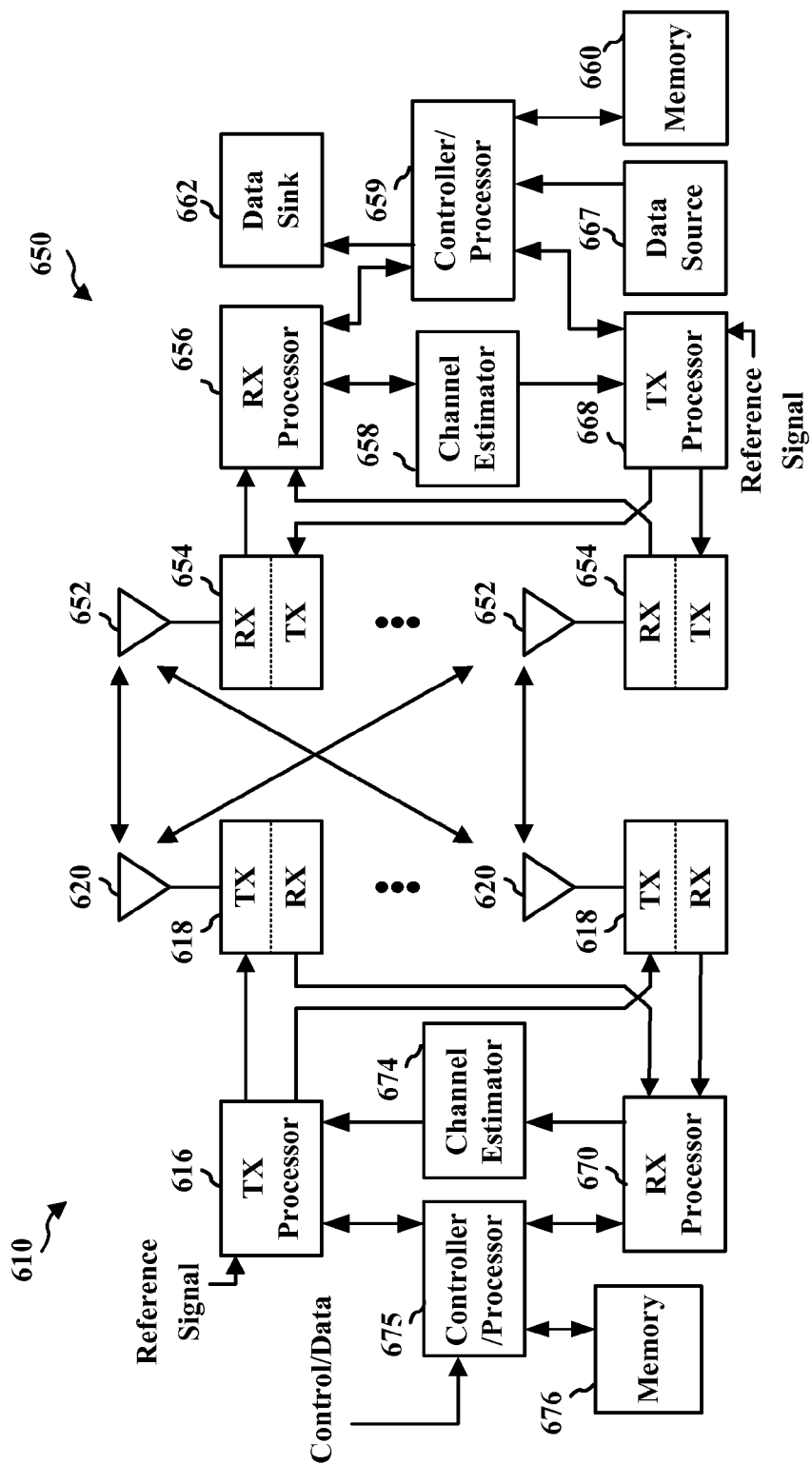
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Various methods for saving power of a UE are available in LTE. Such methods may include RRC connected mode discontinuous reception (DRX) (also herein referred to as "DRX mode") and the RRC idle mode. In RRC connected mode DRX, the radio of the UE is disabled for specific periods of time as defined by a DRX cycle negotiated between the UE and an eNB. In the RRC idle mode, the UE has not established an RRC connection and, therefore, the amount of signaling and power required for the UE to maintain the RRC connection is be reduced. Either RRC connected mode DRX or RRC idle mode may be selected to save power of a UE depending on the mobility and traffic profile of a user.

Typically, RRC idle mode is preferred for users with high mobility because it causes less handover signaling and because handovers under RRC connected mode DRX are not robust. Moreover, RRC idle mode is also preferred for users with infrequent data activity (e.g., two or three short bursts every hour) for the reasons previously discussed and because RRC connected mode DRX uses more power to manage mobility procedures. However, RRC connected mode DRX is preferred for users who are actively using UEs because it reduces signaling overhead of frequency in the random access channel (RACH) and RRC connection setup, and because it reduces latency associated with transition to the RRC idle mode.

A UE may use an RRC connection to communicate active traffic or background traffic with an eNB. Active traffic refers to data traffic typically resulting from active usage of the UE, such as when the UE is used to stream videos, make voice calls, download one or more files, or browse the Internet. Active traffic may also refer to any traffic that involves relatively high data rate communications. Background traffic refers to data traffic typically resulting from periodic communications initiated by applications residing in the UE when the user of the UE is not actively using the UE, such as when the UE is stored in a pocket or resting on a table. For example, background traffic may refer to periodic short sequence of messages initiated by an email application to check for emails, periodic short message service (SMS) messaging, instant messaging, or social media status update messaging. Background traffic may also refer to any traffic that involves relatively low data rate communications.

Figure 7:
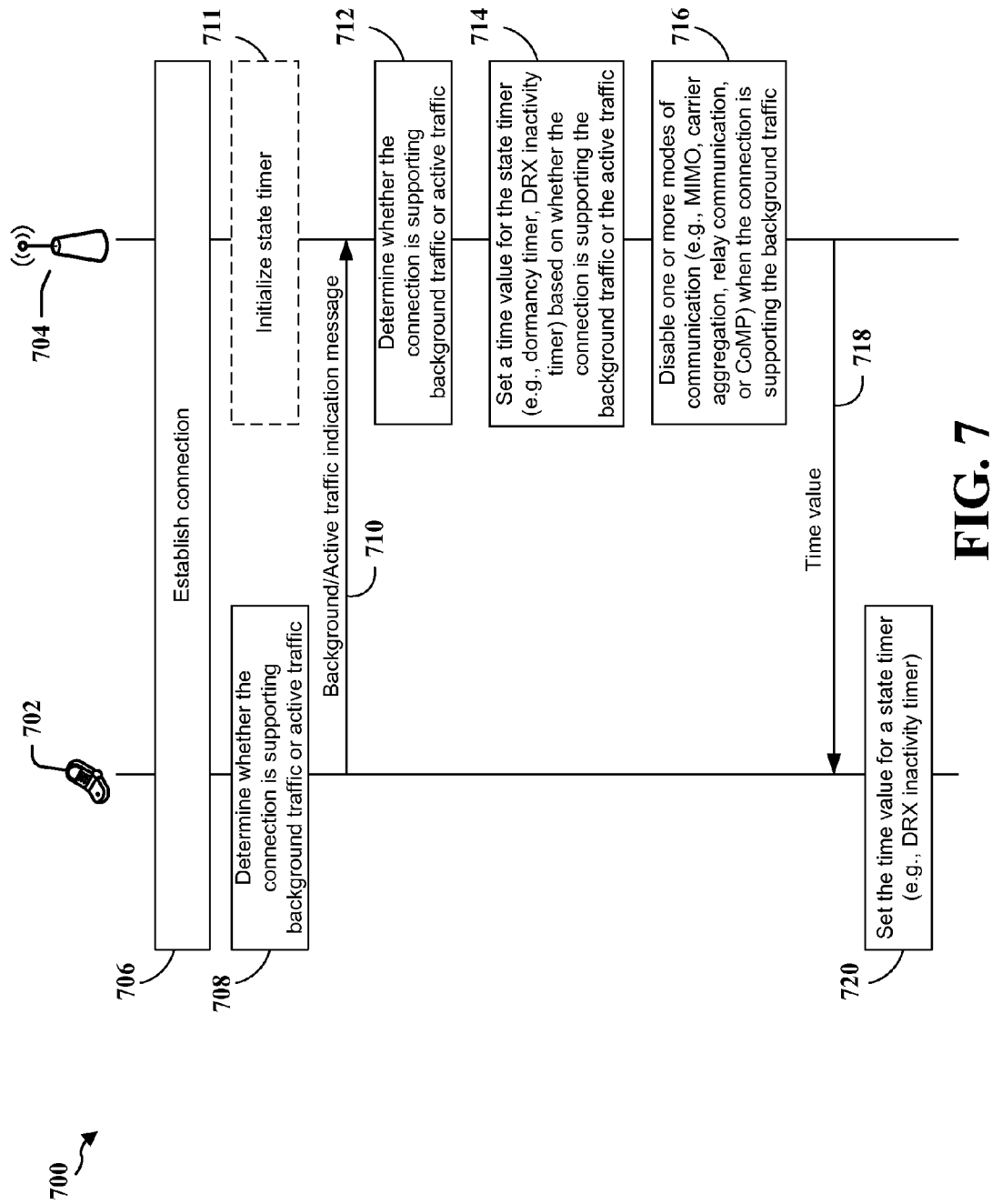
FIG. 7 is a diagram for illustrating an exemplary method of wireless communication.

FIG. 7 is a diagram 700 for illustrating an exemplary method of wireless communication. As shown in FIG. 7, the eNB 704 establishes a connection with the UE 702. In one configuration, the connection may be an RRC connection. The UE 702 may determine 708 whether the connection is supporting active traffic or background traffic and may transmit a message 710 to the eNB 704 indicating whether the connection is supporting either active traffic or background traffic. Although the message 710 in FIG. 7 is shown as being transmitted subsequent to establishment of the connection, it should be understood that the message 710 may be sent during setup of the connection in other configurations where the UE 702 has knowledge that the connection is intended for supporting active traffic or background traffic. For example, the message 710 may be an RRC connection request message, an RRC connection setup complete message, or a service request message.

In one configuration, the UE 702 may determine whether the connection is supporting active traffic or background traffic from the operating system (OS) of the UE 702. More specifically, if an application running on the OS initiates the transmission or reception of data packets, the OS may identify the application which initiated the transmission or reception of the data packets and may communicate the identity of the application to a modem of the UE 702. The modem may then classify such data packets as active traffic or background traffic based on the identity of the application. For example, the modem may classify the data packets as background traffic if the identified application is an email application, or as active traffic if the identified application is a Web browsing application.

In another configuration, the UE 702 may determine whether the connection is supporting active traffic or background traffic based on the status of the components of the UE 702 when data packets are transmitted or received. For example, if data packets are transmitted or received by the UE 702 when a display of the UE 702 is turned off, it may be determined that the UE 702 is not being actively used and, therefore, such data packets likely constitute background traffic. Therefore, the UE 702 may classify data packets transmitted or received when a display of the UE 702 is turned off as background traffic. Alternatively, the UE 702 may classify data packets which are transmitted or received when the display of the UE 702 is turned on as active traffic. As another example, the UE 702 may classify data packets which are transmitted or received as background traffic when a motion sensor of the UE 702 detects that the UE 702 is stationary, or as active traffic when the motion sensor of the UE 702 detects that the UE 702 is moving.

As shown in FIG. 7, the eNB 704 may determine 712 whether the connection is supporting active traffic or background traffic. In one configuration, the eNB 704 may use the message 710 from the UE 702 to determine whether the connection is supporting active traffic or background traffic. In another configuration, the eNB 704 may determine whether the connection is supporting active traffic or background traffic by analyzing the traffic on the connection. For example, the eNB 704 may determine that the connection is supporting background traffic when the eNB 704 detects relatively low data traffic on the connection or active traffic when the eNB 704 detects relatively high data traffic on the connection.

As further shown in FIG. 7, the eNB sets a time value 714 for a state timer related to an operating state of the UE 702 based on whether the connection is supporting active traffic or background traffic. In one configuration, the state timer may be a dormancy timer, which is initiated when there is no data activity between the UE 702 and the eNB 704. In such a configuration, if no data activity occurs prior to expiration of the dormancy timer, the eNB 704 may terminate the connection and may send the UE 702 to idle mode. For example, the connection may be an RRC connection and the idle mode may be an RRC idle mode. The eNB 704 may set a relatively long time period (e.g., approximately 30.0 seconds) for the dormancy timer when the connection is supporting active traffic and may set a relatively short time period (e.g., approximately 5.0 seconds) for the dormancy timer when the connection is supporting background traffic. Therefore, the UE 702 may enter the idle mode more quickly when the connection is supporting background traffic to provide greater power savings.

In another configuration, the state timer may be a DRX inactivity timer which is initiated in the DRX mode of the UE 702. The DRX mode is a power saving protocol in LTE. When the UE 702 is operating in the DRX mode, the radio of the UE 702 is disabled for specific periods of time as defined by a DRX cycle negotiated between the UE 702 and eNB 704. During the periods that the radio is not disabled and may receive transmissions from the eNB 704, the UE 702 monitors a packet data control channel (PDCCH). When a PDCCH is successfully decoded by the UE 702, the DRX inactivity timer is initiated. If the UE 702 successfully decodes a subsequent PDCCH prior to the expiration of the DRX inactivity timer, the DRX inactivity timer is restarted. In one configuration, the duration of the DRX inactivity timer may be defined in terms of a number of consecutive PDCCH-subframe(s). The eNB 704 may set a relatively long time period (e.g., approximately 50.0 milliseconds) for the DRX inactivity timer when the connection is supporting active traffic and may set a relatively short time period (e.g., approximately 25.0 milliseconds) for the DRX inactivity timer when the connection is supporting background traffic. As such, when the connection is supporting background traffic, the period of time that the radio of the UE 702 is enabled in the DRX mode may be reduced to provide greater power savings. In one configuration, the eNB 704 may keep the UE 702 in the DRX mode when the connection is supporting background traffic.

As shown in FIG. 7, the eNB 704 may disable one or more modes of communication with the UE 702 when the connection is supporting background traffic. The one or more modes of communication may be those that cause substantial power consumption in the UE 702. For example, the one or more modes of communication may include multiple-input and multiple-output (MIMO), carrier aggregation, relay communication, and coordinated multipoint transmission (CoMP) support. MIMO involves the use of multiple antennas at both a UE and an eNB to improve communication performance. Carrier aggregation involves the concurrent utilization of radio resources across multiple carriers to increase the effective bandwidth delivered to a UE. CoMP involves transmission and reception between a UE with multiple geographically separated eNBs to increase data transmission rates. Relay communication involves the use of relay nodes to extend cell coverage areas and to improve indoor signal reception by a UE.

As shown in FIG. 7, the eNB 704 may send the time value 718 for the state timer, such as a DRX inactivity timer, to the UE 702. The UE 702 may set the time value 720 for the state timer at the UE 702.

In one configuration, the eNB 704 may initialize a state timer 711 related to an operating state of the UE 702 to a predetermined time value based on power class or the location of the eNB 704. For example, if the UE 702 is in a low power class, the predetermined time value may be a relatively short time period. Alternatively, if the UE 702 is in a high power class, the predetermined time value may be a relatively long time period. In one configuration, the state timer may be a dormancy timer as discussed herein. Therefore, in such a configuration, a UE in a low power class may use a relatively short time period (e.g., 10.0 seconds) for a dormancy timer to cause a fast transition to the RRC idle mode. As a result, the DRX mode may be used less frequently. However, a UE in a high power class may use a relatively longer time period (e.g., 20.0 seconds) for the dormancy timer to cause a slow transition to the RRC idle mode. As a result, the DRX mode may be used more frequently.

As another example, if the location of the eNB 704 generally includes an area likely to have highly mobile users (e.g., an area including a highway), the predetermined time value may be a relatively short time period. Alternatively, if the location of the eNB 704 does not include an area likely to have highly mobile users (e.g., an area including a shopping mall), the predetermined time value may be a relatively long time period. In one configuration, the state timer may be a dormancy timer as discussed herein. Therefore, in such a configuration, cells likely to have highly mobile users may use a relatively short time period (e.g., 10.0 seconds) for a dormancy timer to cause a fast transition to the RRC idle mode. As a result, the DRX mode may be used less frequently. However, cells that are not likely to have highly mobile users may use a relatively longer time period (e.g., 20.0 seconds) for the dormancy timer to cause a slow transition to the RRC idle mode. As a result, the DRX mode may be used more frequently.

Figure 8:
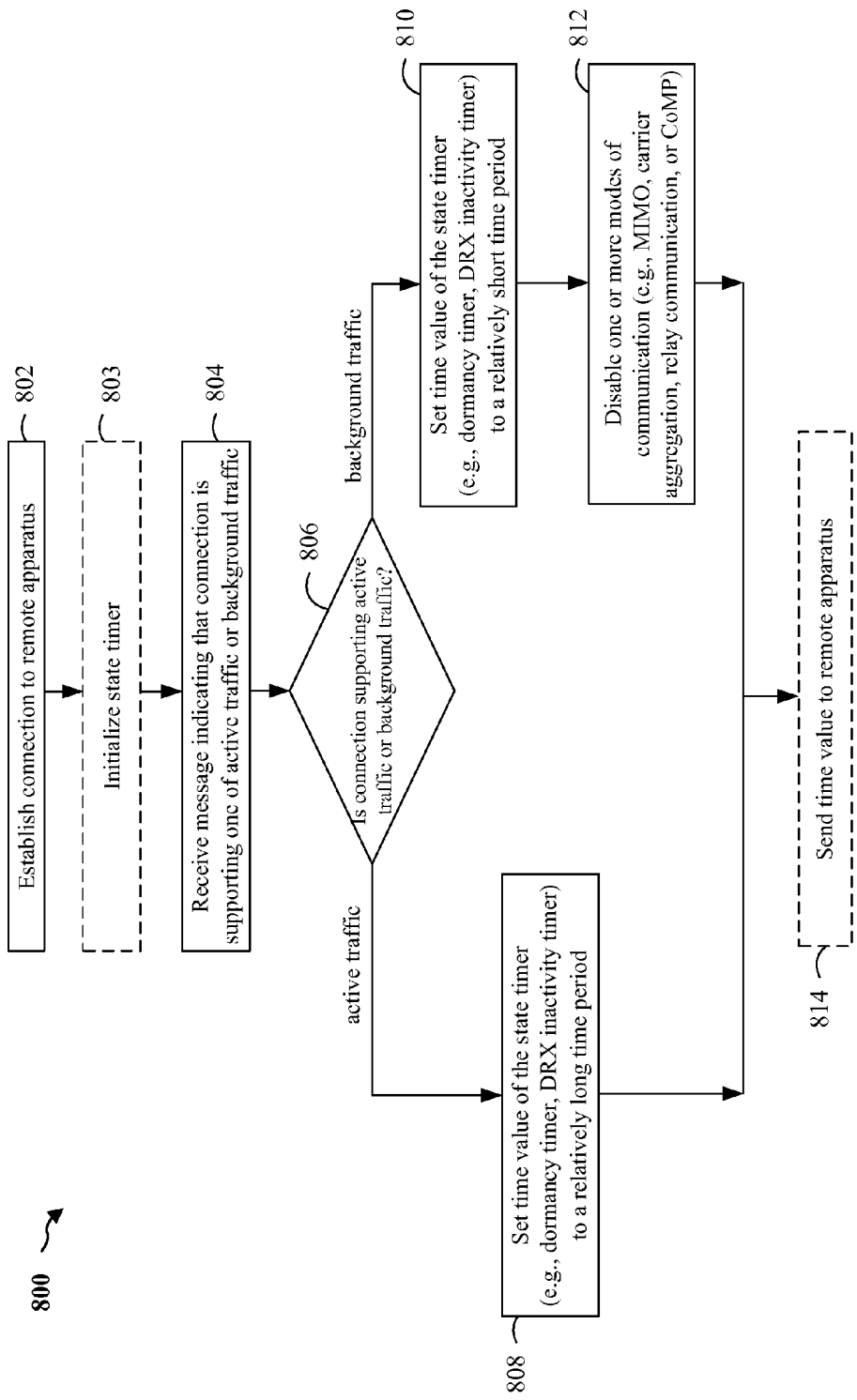
FIG. 8 is a flow chart of a method of wireless communication.

FIG. 8 is a flow chart of a method of wireless communication. The method may be performed by an apparatus. In an aspect, the apparatus may be an eNB, such as eNB 704 shown in FIG. 7. At step 802, the eNB may establish a connection with a remote apparatus. In an aspect, the remote apparatus may be a UE, such as UE 702 shown in FIG. 7. In one configuration, the connection may be an RRC connection.

At step 803, the eNB may initialize a state timer related to an operating state of the UE to a predetermined time value based on power class or the location of the eNB. For example, if the UE is in a low power class, the predetermined time value may be a relatively short time period. Alternatively, if the UE is in a high power class, the predetermined time value may be a relatively long time period. In one configuration, the state timer may be a dormancy timer as discussed herein. Therefore, in such a configuration, a UE in a low power class may use a relatively short time period (e.g., 10.0 seconds) for a dormancy timer to cause a fast transition to the RRC idle mode. As a result, the DRX mode may be used less frequently. However, a UE in a high power class may use a relatively longer time period (e.g., 20.0 seconds) for the dormancy timer to cause a slow transition to the RRC idle mode. As a result, the DRX mode may be used more frequently.

As another example, if the location of the eNB generally includes an area likely to have highly mobile users (e.g., an area including a highway), the predetermined time value may be a relatively short time period. Alternatively, if the location of the eNB does not include an area likely to have highly mobile users (e.g., an area including a shopping mall), the predetermined time value may be a relatively long time period. In one configuration, the state timer may be a dormancy timer as discussed herein. Therefore, in such a configuration, cells likely to have highly mobile users may use a relatively short time period (e.g., 10.0 seconds) for a dormancy timer to cause a faster transition to the RRC idle mode. However, cells that are not likely to have highly mobile users may use a relatively longer time period (e.g., 20.0 seconds) for the dormancy timer to cause a slower transition to the RRC idle mode.

At step 804, the eNB may receive a message, such as the Background/Active traffic indication message 710 shown in FIG. 7, indicating that the connection is supporting one of active traffic or background traffic. For example, the message may be received from a UE. In one configuration, the message may be received during setup of the connection. For example, the message may be an RRC connection request message, an RRC connection setup complete message, a service request message, or any message communicated using an RRC protocol.

At step 806, the eNB may determine whether the connection is supporting active traffic or background traffic. In one configuration, the eNB may use the message from the UE to determine whether the connection is supporting active traffic or background traffic. In another configuration, the eNB may determine whether the connection is supporting active traffic or background traffic by analyzing the traffic on the connection. For example, the eNB may determine that the connection is supporting background traffic when the eNB detects relatively low data traffic on the connection, or active traffic when the eNB detects relatively high data traffic on the connection.

If the connection is supporting active traffic (806), then at step 808, the eNB sets a time value for a state timer related to an operating state of the UE to a relatively long time period. However, if the connection is supporting background traffic (806), then at step 810, the eNB sets a time value for the state timer related to an operating state of the UE to a relatively short time period.

In one configuration, the state timer may be a dormancy timer for the UE as described herein and the idle mode may be an RRC idle mode. For example, in such a configuration, the eNB may set a relatively long time period (e.g., approximately 30.0 seconds) for the dormancy timer when the connection is supporting active traffic and may set a relatively short time period (e.g., approximately 5.0 seconds) for the dormancy timer when the connection is supporting background traffic. Therefore, the UE may enter the idle mode more quickly when the connection is supporting background traffic to provide greater power savings.

In another configuration, the state timer may be a DRX inactivity timer for the UE as discussed herein. For example, in such a configuration, the eNB may set a relatively long time period (e.g., approximately 50.0 milliseconds) for the DRX inactivity timer when the connection is supporting active traffic and may set a relatively short time period (e.g., approximately 25.0 milliseconds) for the DRX inactivity timer when the connection is supporting background traffic. As such, when the connection is supporting background traffic, the period of time that the radio of the UE is enabled during DRX may be reduced to provide greater power savings. In one configuration, the eNB 704 may keep the UE in the DRX mode when the connection is supporting background traffic.

At step 812, the eNB may disable one or more modes of communication with the UE when the connection is supporting background traffic. The one or more modes of communication may be those that cause substantial power consumption in the UE. For example, the eNB may disable one or more of MIMO communication, carrier aggregation, relay communication, and CoMP support.

At step 814, the eNB may send the time value, such as time value 718 shown in FIG. 7, for the state timer to the UE. In an aspect, the state time may be a DRX inactivity timer. The UE may set the time value for the state timer.

Figure 9:
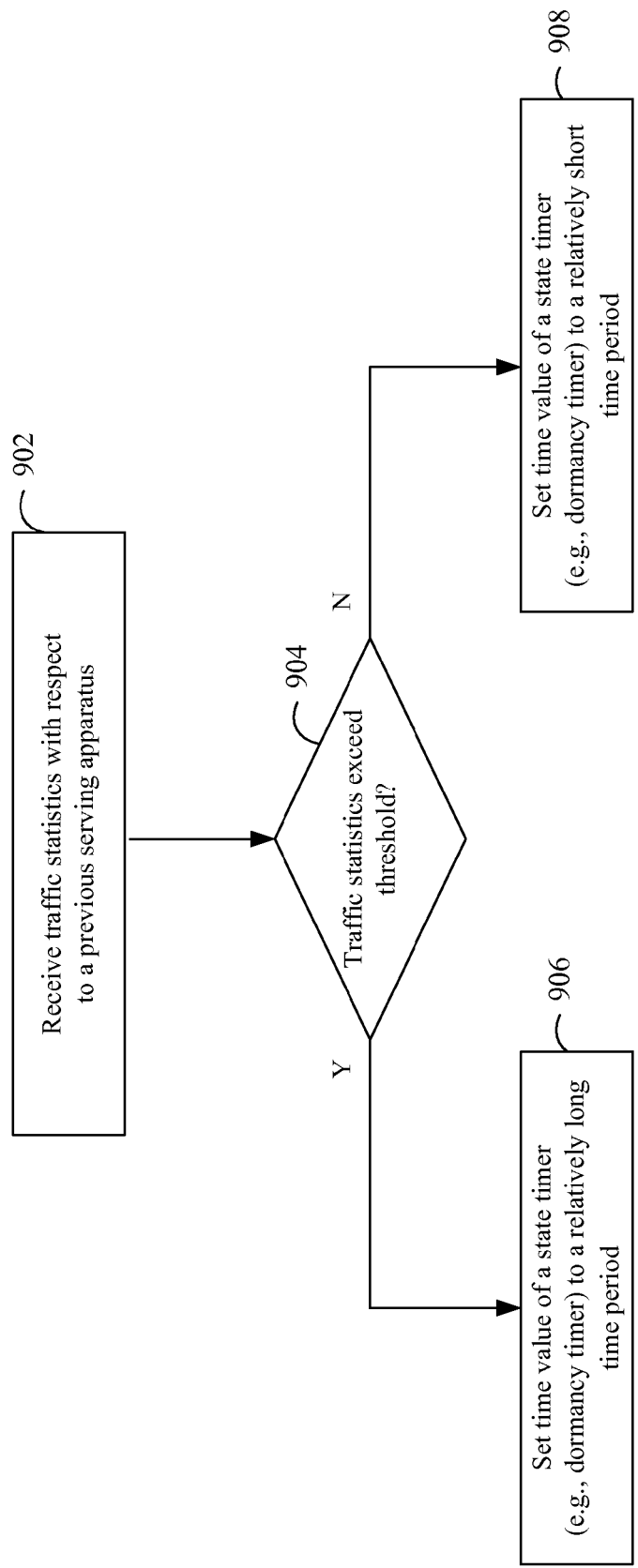
FIG. 9 is a flow chart of a method of wireless communication.

FIG. 9 is a flow chart of a method of wireless communication. The method may be performed by an apparatus, such as an eNB. At step 902, the eNB may receive traffic statistics from at least one of a remote apparatus (e.g., a UE) and a previous serving apparatus (e.g., a previous serving eNB). In one configuration, the traffic statistics may be an average data rate between the UE and a previous serving eNB. For example, the average data rate may be an average data rate for the total amount of data or an average data rate per quality of service (QoS) class. In another configuration, the traffic statistics may be a number of data bytes transmitted between a UE and a previous serving eNB. For example, the number of data bytes may be a number of data bytes for the total amount of data or the number of data bytes per QoS class.

In one configuration, the traffic statistics may be "chained," such that the eNB may receive traffic statistics related to multiple previous serving eNBs. For example, the traffic statistics may be limited to a specific measurement window, such that the average data rate or the number of data bytes are determined only within the last 'T' seconds that the UE remained in communication with the previous serving eNB. For example, T may have a value of 10.0 seconds. In one configuration, the traffic statistics may be received by the eNB via an X2 protocol or S1 protocol.

At step 904, the eNB may compare the traffic statistics to a threshold to determine whether the traffic statistics exceed a threshold. If the traffic statistics exceed a threshold (904), then at step 906, the eNB may set a time value for a state timer related to an operating state of the UE to a relatively long time period. Alternatively, if the traffic statistics do not exceed a threshold (904), then at step 908, the eNB may set the time value for the state timer to a relatively short time period. In one configuration, the state timer may be a dormancy timer. In such a configuration, the eNB may set a relatively long time period (e.g., approximately 25.0 seconds) for the dormancy timer when the traffic statistics exceed a threshold and may set a relatively short time period (e.g., approximately 12.0 seconds) for the dormancy timer when the traffic statistics do not exceed a threshold. For example, the threshold may be a data rate or a number of bytes. Therefore, the UE may enter the idle mode more quickly when the UE is likely to have relatively low data traffic activity.

In one configuration, if the average data rate or the number of data bytes of the traffic statistics correspond to a particular QoS class, the time value for the state timer may be set differently based on the particular QoS class. For example, if a particular QoS class has strict QoS requirements, then a relatively long time period (e.g., 15.0 seconds) may be set for the state timer. However, if a particular QoS class does not have strict QoS requirements, then a shorter time period (e.g., 5.0 seconds) may be set for the state timer. Therefore, a UE may enter the idle mode quickly when the QoS class corresponding to the data traffic of the UE does not have strict QoS requirements and may take longer to enter the idle mode when the QoS class corresponding to the data traffic of the UE has strict QoS requirements.

Figure 10:
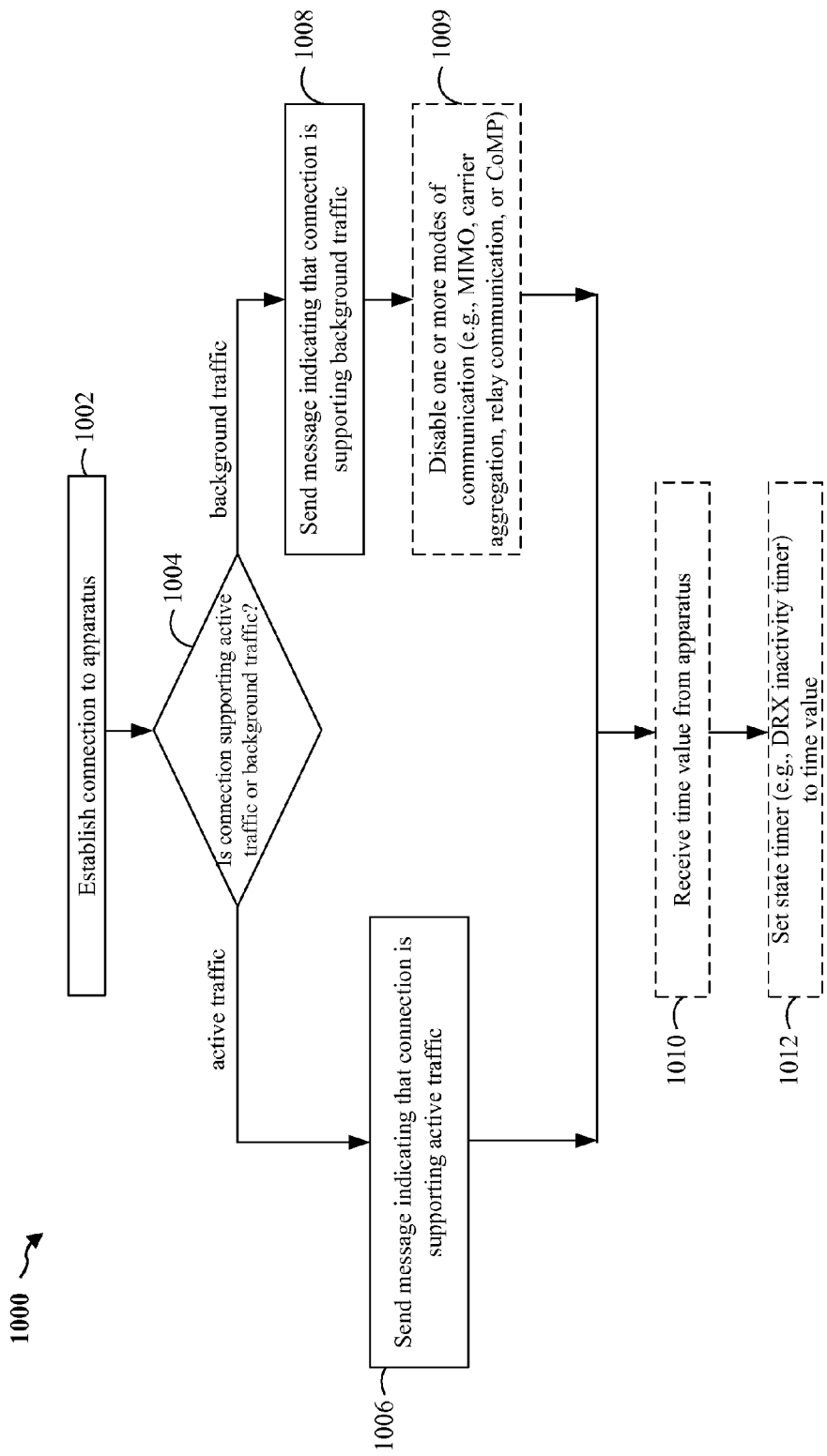
FIG. 10 is a flow chart of a method of wireless communication.

FIG. 10 is a flow chart 1000 of a method of wireless communication. The method may be performed by a remote apparatus. In an aspect, the remote apparatus may be a UE, such as UE 702 shown in FIG. 7. At step 1002, the UE establishes a connection to an apparatus, where the connection is configured to support at least one of background traffic and active traffic. In an aspect, the apparatus may be an eNB, such as eNB 704 shown in FIG. 7. In one configuration, the connection may be an RRC connection.

At step 1004, the UE determines whether the connection is supporting the background traffic or the active traffic. In one configuration, the UE may determine that the connection is supporting background traffic by detecting that a transmission is initiated by an application (e.g., an email application) of the UE. In another configuration, the UE may determine that the connection is supporting active traffic by detecting that a transmission is initiated by a user of the UE.

At step 1006, if the connection is supporting active traffic, the UE sends a message to the apparatus, such as the Background/Active traffic indication message 710 shown in FIG. 7, indicating that the connection is supporting active traffic. At step 1008, if the connection is supporting background traffic, the UE sends a message to the apparatus indicating that the connection is supporting background traffic. In one configuration, the message may be sent during setup of the connection. For example, the message may be an RRC connection request message, an RRC connection setup complete message, or a service request message.

At step 1009, the UE disables one or more modes of communication when the connection is supporting background traffic. The one or more modes of communication may be those that cause substantial power consumption in the UE. For example, the one or more modes of communication that may be disabled include MIMO communication, carrier aggregation, relay communication, and CoMP support.

At step 1010, the UE receives a time value, such as time value 718 shown in FIG. 7, for a state timer related to an operating state of the UE, the time value being set based on whether the connection is supporting the background traffic or the active traffic. In one configuration, the state timer may be a DRX inactivity timer. For example, in such a configuration, a relatively long time period (e.g., approximately 50.0 milliseconds) may be set for the DRX inactivity timer when the connection is supporting active traffic and a relatively short time period (e.g., approximately 25.0 milliseconds) may be set for the DRX inactivity timer when the connection is supporting background traffic. As such, when the connection is supporting background traffic, the period of time that the radio of the UE is enabled during DRX may be reduced to provide greater power savings. Finally, at step 1012, the UE sets the state timer to the time value.

Figure 11:
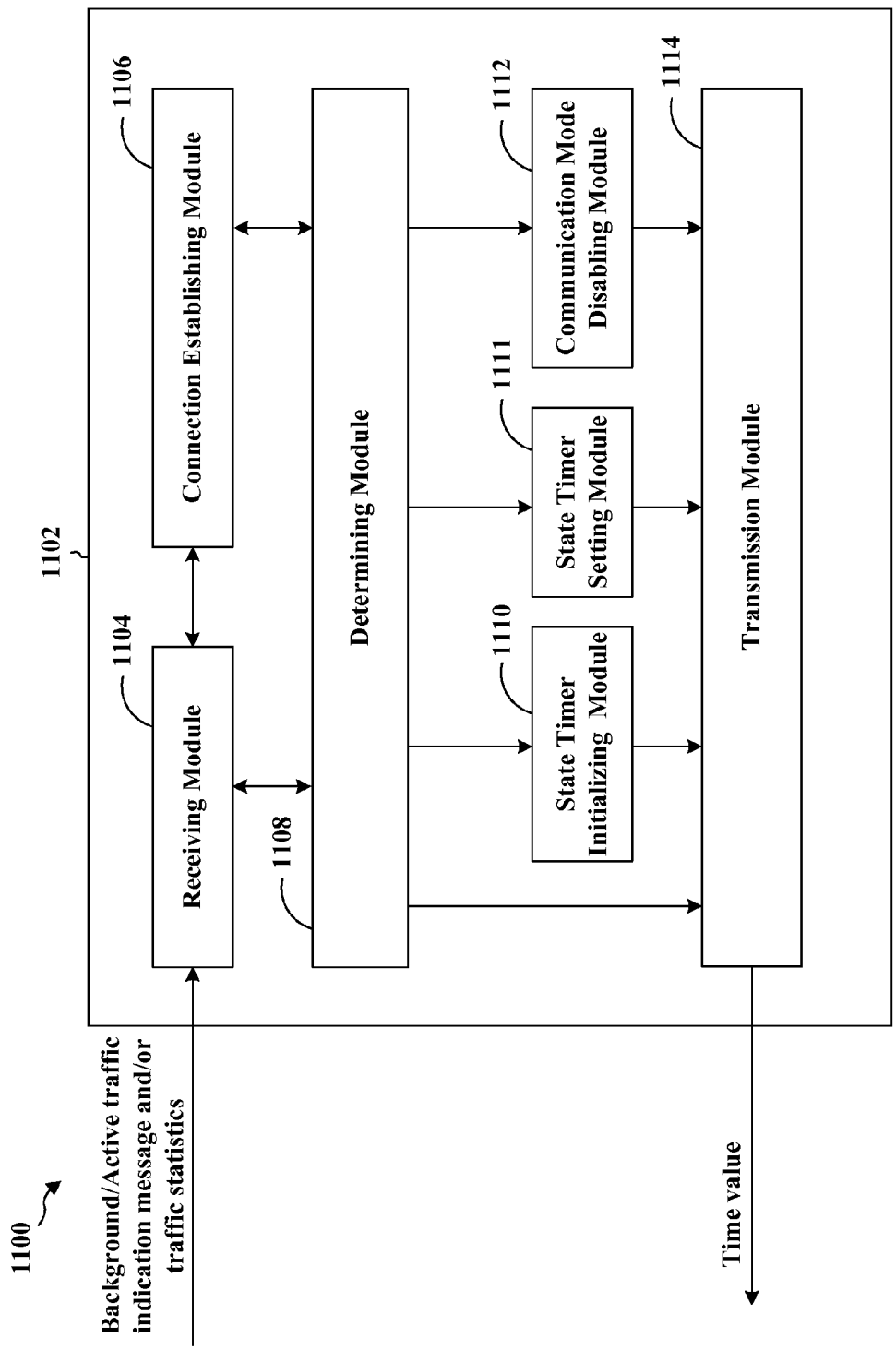
FIG. 11 is a conceptual data flow diagram illustrating the data flow between different modules/means/components in an exemplary apparatus.

FIG. 11 is a conceptual data flow diagram 1100 illustrating the data flow between different modules/means/components in an exemplary apparatus 1102. The apparatus may be an eNB. The apparatus 1102 includes a receiving module 1104 that may configured to receive a message from a remote apparatus indicating that the connection is supporting one of the background traffic or the active traffic. The receiving module 1104 may be further configured to receive, from at least one of the remote apparatus and a previous serving apparatus, traffic statistics with respect to a previous serving apparatus. The apparatus 1102 further includes connection establishing module 1106 that may be configured to establish a connection to a remote apparatus, the connection configured to support at least one of background traffic and active traffic.

The apparatus 1102 further includes a determining module 1108 that may be configured to determine whether the connection is supporting the background traffic or the active traffic by analyzing traffic on the connection. The determining module 1108 may be further configured to determine whether the connection is supporting the background traffic or the active traffic using the message. The determining module 1108 may be further configured to determine whether the traffic statistics exceed a threshold.

The apparatus 1102 further includes a state timer initializing module 1110 that may be configured to initialize the state timer to a predetermined time value based on at least one of a power class and a location of the apparatus. The apparatus 1102 further includes a state timer setting module 1111 that may be configured to set a time value for a state timer related to an operating state of the remote apparatus based on whether the connection is supporting the background traffic or the active traffic. The apparatus 1102 further includes a communication mode disabling module 1112 that may be configured to disable one or more modes of communication based on whether the connection is supporting the background traffic or the active traffic. The apparatus 1102 further includes a transmission module 1114 that may be configured to send the time value to the remote apparatus.

The apparatus may include additional modules that perform each of the steps of the algorithm in the aforementioned flow charts FIGS. 8 and 9. As such, each step in the aforementioned flow charts of FIGS. 8 and 9 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 12:
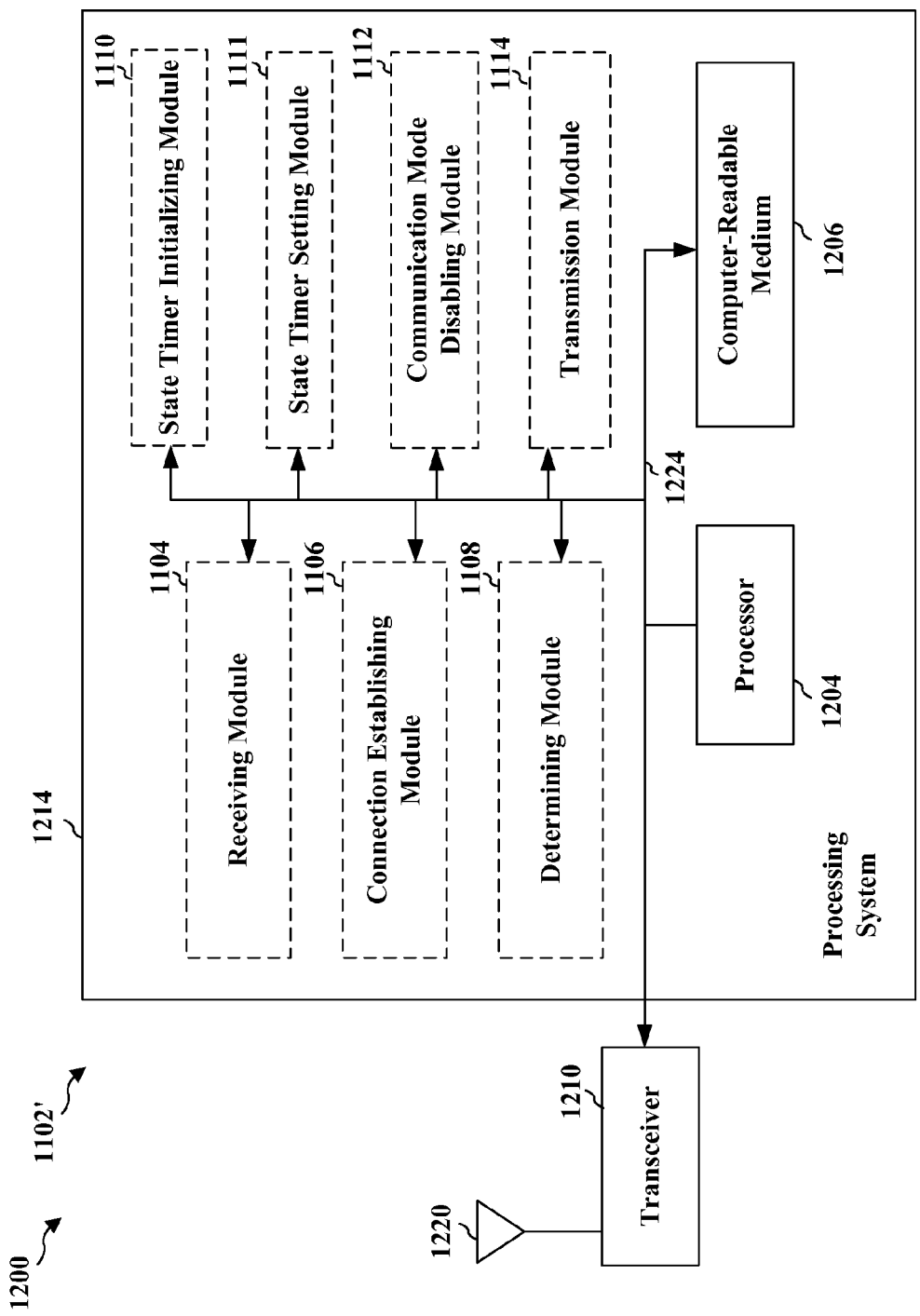
FIG. 12 is a diagram illustrating an example of a hardware implementation for an apparatus employing a processing system.

FIG. 12 is a diagram illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware modules, represented by the processor 1204, the modules 1104, 1106, 1108, 1110, 1111, 1112, and 1114, and the computer-readable medium 1106. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The processing system 1214 includes a processor 1204 coupled to a computer-readable medium 1206. The processor 1204 is responsible for general processing, including the execution of software stored on the computer-readable medium 1206. The software, when executed by the processor 1204, causes the processing system 1214 to perform the various functions described supra for any particular apparatus. The computer-readable medium 1206 may also be used for storing data that is manipulated by the processor 1204 when executing software. The processing system further includes at least one of the modules 1104, 1106, 1108, 1110, 1111, 1112, and 1114. The modules may be software modules running in the processor 1204, resident/stored in the computer readable medium 1206, one or more hardware modules coupled to the processor 1204, or some combination thereof. The processing system 1214 may be a component of the eNB 610 and may include the memory 676 and/or at least one of the TX processor 616, the RX processor 670, and the controller/processor 675.

In one configuration, the apparatus 1102/1102' for wireless communication includes means for establishing a connection to a remote apparatus, the connection configured to support at least one of background traffic and active traffic, means for setting a time value for a state timer related to an operating state of the remote apparatus based on whether the connection is supporting the background traffic or the active traffic, means for determining whether the connection is supporting the background traffic or the active traffic by analyzing traffic on the connection, means for receiving a message from the remote apparatus indicating that the connection is supporting one of the background traffic or the active traffic, means for determining whether the connection is supporting the background traffic or the active traffic using the message, means for initializing the state timer to a predetermined time value based on at least one of a power class and a location of the apparatus, means for receiving, from at least one of the remote apparatus and a previous serving apparatus, traffic statistics with respect to a previous serving apparatus, wherein setting the time value for the state timer is further based on the traffic statistics, means for sending the time value to the remote apparatus, means for disabling one or more modes of communication based on whether the connection is supporting the background traffic or the active traffic. The aforementioned means may be one or more of the aforementioned modules of the apparatus 1102 and/or the processing system 1214 of the apparatus 1102' configured to perform the functions recited by the aforementioned means. As described supra, the processing system 1214 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

Figure 13:
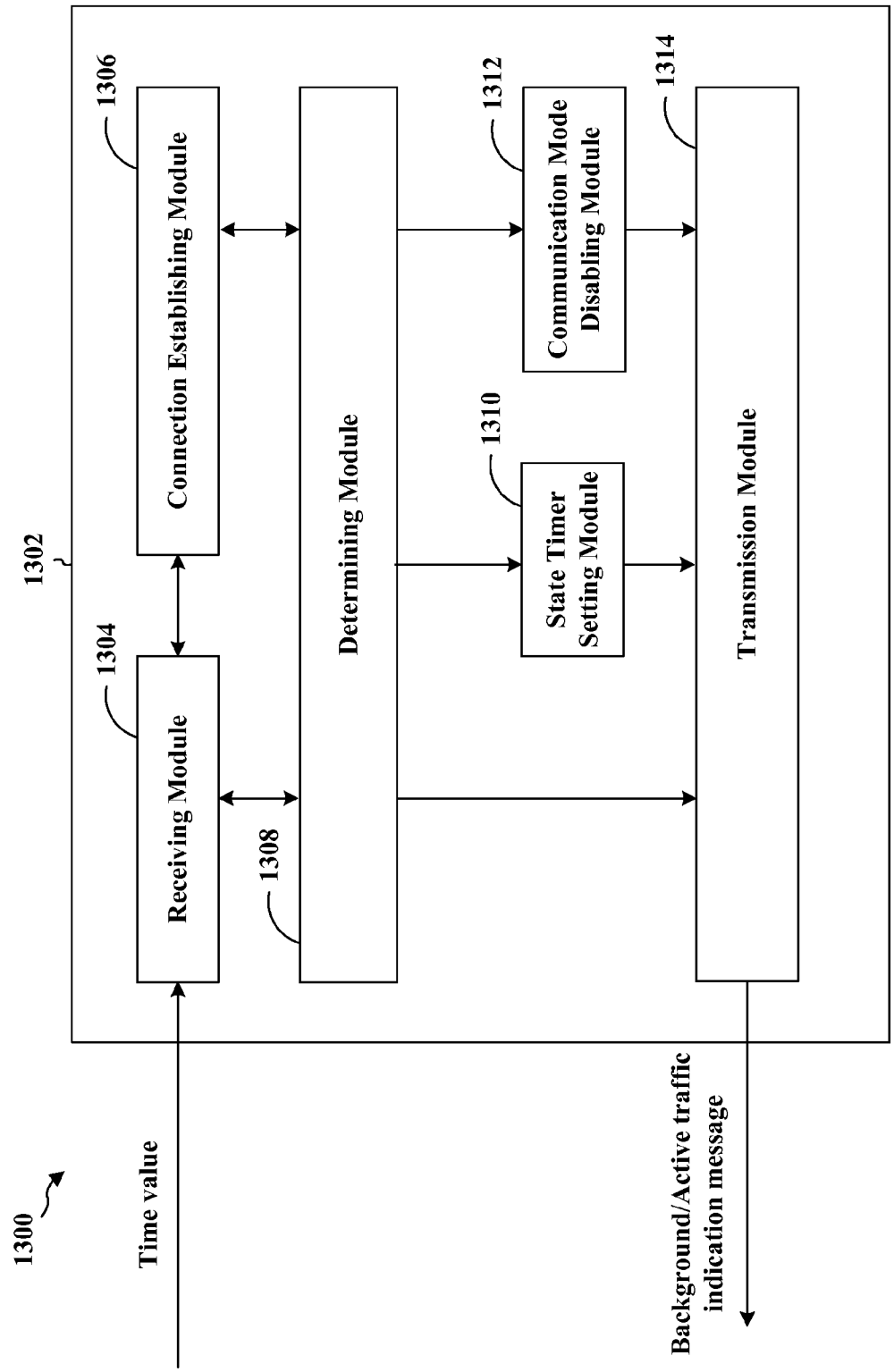
FIG. 13 is a conceptual data flow diagram illustrating the data flow between different modules/means/components in an exemplary apparatus.

FIG. 13 is a conceptual data flow diagram 1300 illustrating the data flow between different modules/means/components in an exemplary remote apparatus 1302. The remote apparatus may be a UE. The remote apparatus 1302 includes a receiving module 1304 that is configured to receive a time value for a state timer related to an operating state of the remote apparatus, the time value being set based on whether the connection is supporting the background traffic or the active traffic. The remote apparatus 1302 further includes a connection establishing module 1306 that is configured to establish a connection to an apparatus, the connection configured to support at least one of background traffic and active traffic. The remote apparatus 1302 further includes a determining module 1308 that is configured to determine whether the connection is supporting the background traffic or the active traffic. The remote apparatus 1302 further includes a state timer setting module 1310 configured to set the state timer to the time value. The remote apparatus 1302 further includes a communication mode disabling module 1312 configured to disable one or more modes of communication based on whether the connection is supporting the background traffic or the active traffic. The remote apparatus 1302 further includes a transmission module 1314 configured to send a message to the apparatus indicating that the connection is supporting one of the background traffic or the active traffic The remote apparatus may include additional modules that perform each of the steps of the algorithm in the aforementioned flow chart of FIG. 10. As such, each step in the aforementioned flow chart of FIG. 10 may be performed by a module and the remote apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 14:
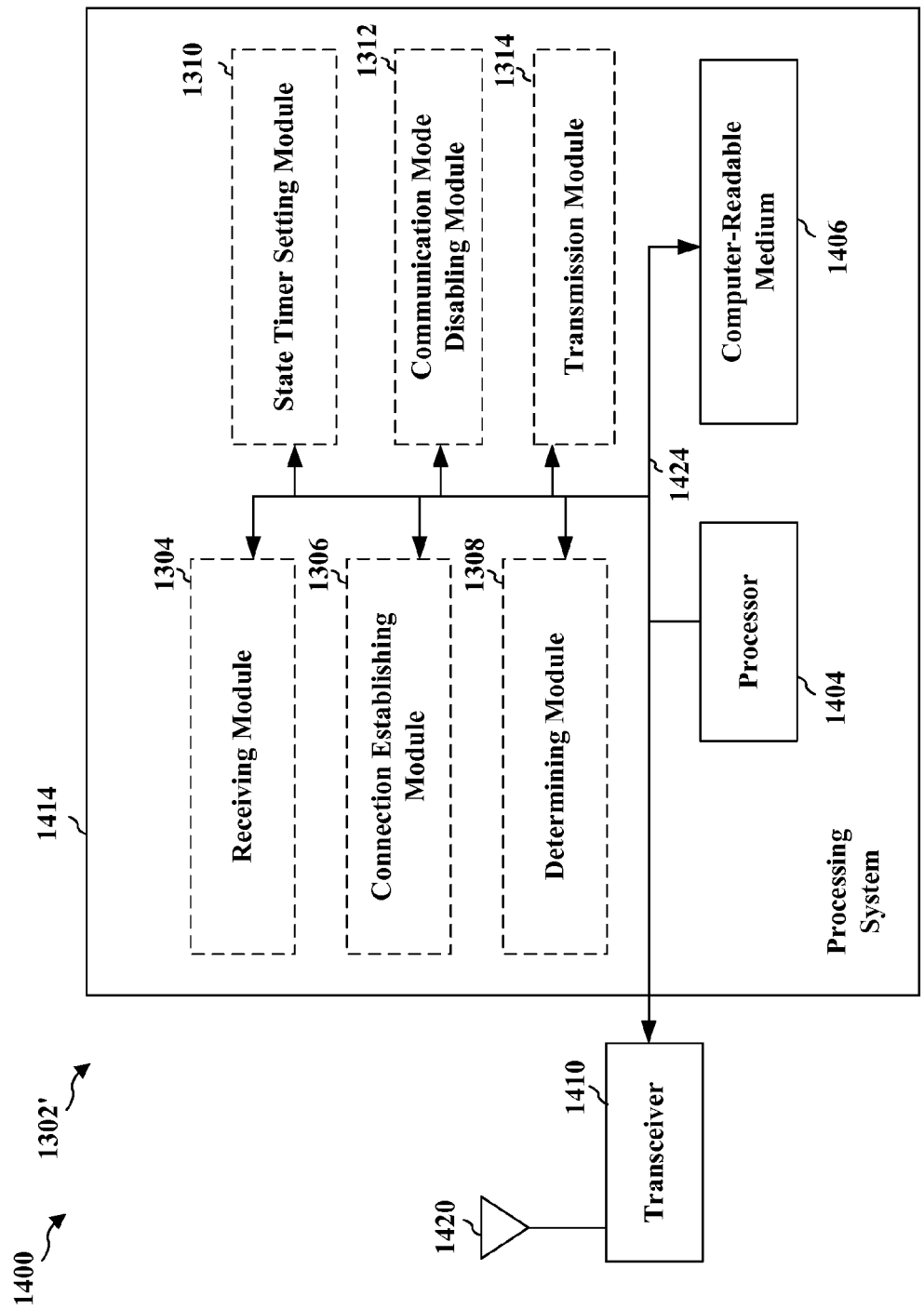
FIG. 14 is a diagram illustrating an example of a hardware implementation for an apparatus employing a processing system.

FIG. 14 is a diagram illustrating an example of a hardware implementation for a remote apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware modules, represented by the processor 1404, the modules 1304, 1306, 1308, 1310, 1312, and 1314, and the computer-readable medium 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The processing system 1414 includes a processor 1404 coupled to a computer-readable medium 1406. The processor 1404 is responsible for general processing, including the execution of software stored on the computer-readable medium 1406. The software, when executed by the processor 1404, causes the processing system 1414 to perform the various functions described supra for any particular apparatus. The computer-readable medium 1406 may also be used for storing data that is manipulated by the processor 1404 when executing software. The processing system further includes at least one of the modules 1304, 1306, 1308, 1310, 1312, and 1314. The modules may be software modules running in the processor 1404, resident/stored in the computer readable medium 1406, one or more hardware modules coupled to the processor 1404, or some combination thereof. The processing system 1414 may be a component of the UE 650 and may include the memory 660 and/or at least one of the TX processor 668, the RX processor 656, and the controller/processor 659.

In one configuration, the remote apparatus 1302/1302' for wireless communication includes means for establishing a connection to an apparatus, the connection configured to support at least one of background traffic and active traffic, means for determining whether the connection is supporting the background traffic or the active traffic, means for sending a message to the apparatus indicating that the connection is supporting one of the background traffic or the active traffic, means for receiving a time value for a state timer related to an operating state of the remote apparatus, the time value being set based on whether the connection is supporting the background traffic or the active traffic, means for setting the state timer to the time value, and means for disabling one or more modes of communication based on whether the connection is supporting the background traffic or the active traffic.

The aforementioned means may be one or more of the aforementioned modules of the remote apparatus 1302 and/or the processing system 1414 of the remote apparatus 1302' configured to perform the functions recited by the aforementioned means. As described supra, the processing system 1414 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication from an apparatus, comprising:
  establishing a connection to a remote apparatus, the connection configured to support at least one of background traffic and active traffic;
  receiving a message from the remote apparatus indicating that the connection is supporting one of the background traffic or the active traffic;

determining whether the connection is supporting the background traffic or the active traffic using the message;

setting a time value for a state timer related to an operating state of the remote apparatus based on whether the connection is supporting the background traffic or the active traffic; and receiving, from at least one of the remote apparatus and a previous serving apparatus, traffic statistics with respect to a previous serving apparatus, wherein setting the time value for the state timer is further based on the traffic statistics.

2. The method of claim 1, wherein the state timer is a dormancy timer or a discontinuous reception (DRX) inactivity timer.

3. The method of claim 1, wherein:
the time value is set to a relatively short time period when the connection is supporting the background traffic; and
the time value is set to a relatively long time period when the connection is supporting the active traffic.

4. The method of claim 1, further comprising determining whether the connection is supporting the background traffic or the active traffic by analyzing traffic on the connection.

5. The method of claim 1, further comprising initializing the state timer to a predetermined time value based on at least one of a power class and a location of the apparatus.

6. The method of claim 5, wherein:
the predetermined time value is a relatively short time period when the location of the apparatus includes an area likely to have highly mobile users; and
the predetermined time value is a relatively long time period when the location of the apparatus does not include an area likely to have highly mobile users.

7. The method of claim 1, wherein:
the time value for the state timer is set to a relatively short time period when the traffic statistics do not exceed a threshold; and
the time value for the state timer is set to a relatively long time period when the traffic statistics exceed a threshold.

8. The method of claim 1, wherein the traffic statistics include at least one of an average data rate and a number of data bytes.

9. The method of claim 1, further comprising sending the time value to the remote apparatus.

10. The method of claim 1, wherein:
the apparatus is an evolved Node B (eNB); and
the remote apparatus is a user equipment (UE).

11. A method of wireless communication from an apparatus, comprising:
establishing a connection to a remote apparatus, the connection configured to support at least one of background traffic and active traffic;
disabling one or more modes of communication based on whether the connection is supporting the background traffic or the active traffic;
setting a time value for a state timer related to an operating state of the remote apparatus based on whether the connection is supporting the background traffic or the active traffic; and
receiving, from at least one of the remote apparatus and a previous serving apparatus, traffic statistics with respect to a previous serving apparatus, wherein setting the time value for the state timer is further based on the traffic statistics.

12. The method of claim 11, further comprising:
receiving a message from the remote apparatus indicating that the connection is supporting one of the background traffic or the active traffic; and
determining whether the connection is supporting the background traffic or the active traffic using the message.

13. The method of claim 11, wherein the one or more modes of communication are disabled when the connection is supporting the background traffic.

14. The method of claim 11, further comprising determining whether the connection is supporting the background traffic or the active traffic by analyzing traffic on the connection.

15. The method of claim 11, wherein the one or more modes of communication include at least one of multiple input multiple output (MIMO), carrier aggregation, relay communication, and coordinated multipoint transmission (CoMP).

16. The method of claim 11, wherein:
the apparatus is an evolved Node B (eNB); and
the remote apparatus is a user equipment (UE).

17. An apparatus for wireless communication, comprising:
means for establishing a connection to a remote apparatus, the connection configured to support at least one of background traffic and active traffic;
means for receiving a message from the remote apparatus indicating that the connection is supporting one of the background traffic or the active traffic;
means for determining whether the connection is supporting the background traffic or the active traffic using the message;
means for setting a time value for a state timer related to an operating state of the remote apparatus based on whether the connection is supporting the background traffic or the active traffic; and
means for receiving, from at least one of the remote apparatus and a previous serving apparatus, traffic statistics with respect to a previous serving apparatus, wherein setting the time value for the state timer is further based on the traffic statistics.

18. The apparatus of claim 17, wherein the state timer is a dormancy timer or a discontinuous reception (DRX) inactivity timer.

19. The apparatus of claim 17, wherein:
the time value is set to a relatively short time period when the connection is supporting the background traffic; and
the time value is set to a relatively long time period when the connection is supporting the active traffic.

20. The apparatus of claim 17, further comprising means for determining whether the connection is supporting the background traffic or the active traffic by analyzing traffic on the connection.

21. The apparatus of claim 17, further comprising means for initializing the state timer to a predetermined time value based on at least one of a power class and a location of the apparatus.

22. The apparatus of claim 21, wherein:
the predetermined time value is a relatively short time period when the location of the apparatus includes an area likely to have highly mobile users; and
the predetermined time value is a relatively long time period when the location of the apparatus does not include an area likely to have highly mobile users.

23. The apparatus of claim 17, wherein:
the time value for the state timer is set to a relatively short time period when the traffic statistics do not exceed a threshold; and
the time value for the state timer is set to a relatively long time period when the traffic statistics exceed a threshold.

24. The apparatus of claim 17, wherein the traffic statistics include at least one of an average data rate and a number of data bytes.

25. The apparatus of claim 17, further comprising means for sending the time value to the remote apparatus.

26. The apparatus of claim 17, wherein:
the apparatus is an evolved Node B (eNB); and
the remote apparatus is a user equipment (UE).

27. An apparatus for wireless communication, comprising:
means for establishing a connection to a remote apparatus, the connection configured to support at least one of background traffic and active traffic;
means for disabling one or more modes of communication based on whether the connection is supporting the background traffic or the active traffic;
means for setting a time value for a state timer related to an operating state of the remote apparatus based on whether the connection is supporting the background traffic or the active traffic; and
means for receiving, from at least one of the remote apparatus and a previous serving apparatus, traffic statistics with respect to a previous serving apparatus, wherein setting the time value for the state timer is further based on the traffic statistics.

28. The apparatus of claim 27, further comprising:
means for receiving a message from the remote apparatus indicating that the connection is supporting one of the background traffic or the active traffic; and
means for determining whether the connection is supporting the background traffic or the active traffic using the message.

29. The apparatus of claim 27, wherein the one or more modes of communication are disabled when the connection is supporting the background traffic.

30. The apparatus of claim 27, further comprising means for determining whether the connection is supporting the background traffic or the active traffic by analyzing traffic on the connection.

31. The apparatus of claim 27, wherein the one or more modes of communication include at least one of multiple input multiple output (MIMO), carrier aggregation, relay communication, and coordinated multipoint transmission (CoMP).

32. The apparatus of claim 27, wherein:
the apparatus is an evolved Node B (eNB); and
the remote apparatus is a user equipment (UE).

33. An apparatus for wireless communication, comprising:
a processing system configured to:
establish a connection to a remote apparatus, the connection configured to support at least one of background traffic and active traffic;
receive a message from the remote apparatus indicating that the connection is supporting one of the background traffic or the active traffic;
determine whether the connection is supporting the background traffic or the active traffic using the message;
set a time value for a state timer related to an operating state of the remote apparatus based on whether the connection is supporting the background traffic or the active traffic; and
receive, from at least one of the remote apparatus and a previous serving apparatus, traffic statistics with respect to a previous serving apparatus, wherein the time value for the state timer is set further based on the traffic statistics.

34. The apparatus of claim 33, wherein the state timer is a dormancy timer or a discontinuous reception (DRX) inactivity timer.

35. The apparatus of claim 33, wherein:
the time value is set to a relatively short time period when the connection is supporting the background traffic; and
the time value is set to a relatively long time period when the connection is supporting the active traffic.

36. The apparatus of claim 33, wherein the processing system is further configured to determine whether the connection is supporting the background traffic or the active traffic by analyzing traffic on the connection.

37. The apparatus of claim 33, wherein the processing system is further configured to initialize the state timer to a predetermined time value based on at least one of a power class and a location of the apparatus.

38. The apparatus of claim 37, wherein:
the predetermined time value is a relatively short time period when the location of the apparatus includes an area likely to have highly mobile users; and
the predetermined time value is a relatively long time period when the location of the apparatus does not include an area likely to have highly mobile users.

39. The apparatus of claim 33, wherein:
the time value for the state timer is set to a relatively short time period when the traffic statistics do not exceed a threshold; and
the time value for the state timer is set to a relatively long time period when the traffic statistics exceed a threshold.

40. The apparatus of claim 33, wherein the traffic statistics include at least one of an average data rate and a number of data bytes.

41. The apparatus of claim 33, wherein the processing system is further configured to send the time value to the remote apparatus.

42. The apparatus of claim 33, wherein:
the apparatus is an evolved Node B (eNB); and
the remote apparatus is a user equipment (UE).

43. An apparatus for wireless communication, comprising:
a processing system configured to:
establish a connection to a remote apparatus, the connection configured to support at least one of background traffic and active traffic;
disable one or more modes of communication based on whether the connection is supporting the background traffic or the active traffic;
set a time value for a state timer related to an operating state of the remote apparatus based on whether the connection is supporting the background traffic or the active traffic; and
receive, from at least one of the remote apparatus and a previous serving apparatus, traffic statistics with respect to a previous serving apparatus, wherein setting the time value for the state timer is further based on the traffic statistics.

44. The apparatus of claim 43, wherein the processing system is further configured to:
receive a message from the remote apparatus indicating that the connection is supporting one of the background traffic or the active traffic; and
determine whether the connection is supporting the background traffic or the active traffic using the message.

45. The apparatus of claim 43, wherein the one or more modes of communication are disabled when the connection is supporting the background traffic.

46. The apparatus of claim 43, wherein the processing system is further configured to determine whether the connection is supporting the background traffic or the active traffic by analyzing traffic on the connection.

47. The apparatus of claim 43, wherein the one or more modes of communication include at least one of multiple input multiple output (MIMO), carrier aggregation, relay communication, and coordinated multipoint transmission (CoMP).

48. The apparatus of claim 43, wherein:
the apparatus is an evolved Node B (eNB); and
the remote apparatus is a user equipment (UE).

49. A computer program product, comprising:
a non-transitory computer-readable medium comprising code executable by a processor, the code for:
establishing a connection to a remote apparatus, the connection configured to support at least one of background traffic and active traffic; and
receiving a message from the remote apparatus indicating that the connection is supporting one of the background traffic or the active traffic;
determining whether the connection is supporting the background traffic or the active traffic using the message;
setting a time value for a state timer related to an operating state of the remote apparatus based on whether the connection is supporting the background traffic or the active traffic; and
receiving, from at least one of the remote apparatus and a previous serving apparatus, traffic statistics with respect to a previous serving apparatus, wherein setting the time value for the state timer is further based on the traffic statistics.

50. A computer program product, comprising:
a non-transitory computer-readable medium comprising code executable by a processor, the code for:
establishing a connection to a remote apparatus, the connection configured to support at least one of background traffic and active traffic;
disabling one or more modes of communication based on whether the connection is supporting the background traffic or the active traffic;
setting a time value for a state timer related to an operating state of the remote apparatus based on whether the connection is supporting the background traffic or the active traffic; and
receiving, from at least one of the remote apparatus and a previous serving apparatus, traffic statistics with respect to a previous serving apparatus, wherein setting the time value for the state timer is further based on the traffic statistics.

51. A method of wireless communication from a remote apparatus, comprising:
establishing a connection to an apparatus, the connection configured to support at least one of background traffic and active traffic;
determining whether the connection is supporting the background traffic or the active traffic;
sending a message to the apparatus indicating that the connection is supporting one of the background traffic or the active traffic;
receiving a time value for a state timer related to an operating state of the remote apparatus, the time value being set based on whether the connection is supporting the background traffic or the active traffic;
setting the state timer to the time value; and
sending traffic statistics with respect to a previous serving apparatus, wherein setting the time value for the state timer is further based on the traffic statistics.

52. The method of claim 51, wherein:
the time value is set to a relatively short time period when the connection is supporting the background traffic; and
the time value is set to a relatively long time period when the connection is supporting the active traffic.

53. The method of claim 51, wherein the state timer is a discontinuous reception (DRX) inactivity timer.

54. The method of claim 51, further comprising disabling one or more modes of communication based on whether the connection is supporting the background traffic or the active traffic.

55. A remote apparatus for wireless communication, comprising:
means for establishing a connection to an apparatus, the connection configured to support at least one of background traffic and active traffic;
means for determining whether the connection is supporting the background traffic or the active traffic;
means for sending a message to the apparatus indicating that the connection is supporting one of the background traffic or the active traffic;
means for receiving a time value for a state timer related to an operating state of the remote apparatus, the time value being set based on whether the connection is supporting the background traffic or the active traffic;
means for setting the state timer to the time value; and
means for sending traffic statistics with respect to a previous serving apparatus, wherein setting the time value for the state timer is further based on the traffic statistics.

56. The remote apparatus of claim 55, wherein:
the time value is set to a relatively short time period when the connection is supporting the background traffic; and
the time value is set to a relatively long time period when the connection is supporting the active traffic.

57. The remote apparatus of claim 55, wherein the state timer is a discontinuous reception (DRX) inactivity timer.

58. The remote apparatus of claim 55, further comprising means for disabling one or more modes of communication based on whether the connection is supporting the background traffic or the active traffic.

59. A remote apparatus for wireless communication, comprising:
a processing system configured to:
establish a connection to an apparatus, the connection configured to support at least one of background traffic and active traffic;
determine whether the connection is supporting the background traffic or the active traffic;
send a message to the apparatus indicating that the connection is supporting one of the background traffic or the active traffic;
receive a time value for a state timer related to an operating state of the remote apparatus, the time value being set based on whether the connection is supporting the background traffic or the active traffic;
set the state timer to the time value; and
send traffic statistics with respect to a previous serving apparatus, wherein setting the time value for the state timer is further based on the traffic statistics.

60. The remote apparatus of claim 59, wherein the processing system is further configured to:

receive a time value for a state timer related to an operating state of the remote apparatus, the time value being set based on whether the connection is supporting the background traffic or the active traffic; and set the state timer to the time value.

61. The remote apparatus of claim 60, wherein:

the time value is set to a relatively short time period when the connection is supporting the background traffic; and the time value is set to a relatively long time period when the connection is supporting the active traffic.

62. The remote apparatus of claim 60, wherein the state timer is a discontinuous reception (DRX) inactivity timer.

* * * * *